US010395184B1

(12) United States Patent
Merritt

(10) Patent No.: US 10,395,184 B1
(45) Date of Patent: *Aug. 27, 2019

(54) SYSTEM AND METHOD FOR MANAGING ROUTING OF CUSTOMER CALLS TO AGENTS

(71) Applicant: MASSACHUSETTS MUTUAL LIFE INSURANCE COMPANY, Springfield, MA (US)

(72) Inventor: Sears Merritt, Groton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,378

(22) Filed: Feb. 22, 2019

Related U.S. Application Data

(63) Continuation of application No. 16/110,872, filed on Aug. 23, 2018, now Pat. No. 10,229,370.
(Continued)

(51) Int. Cl.
H04M 3/51 (2006.01)
H04M 3/523 (2006.01)
(Continued)

(52) U.S. Cl.
CPC ......... *G06N 20/00* (2019.01); *G06Q 30/0601* (2013.01); *H04M 3/5232* (2013.01); *H04M 2203/556* (2013.01); *H04M 2203/558* (2013.01)

(58) Field of Classification Search
CPC ...... G06N 5/022; G06N 99/005; G06N 20/00; G06Q 30/0201; G06Q 30/0601;
(Continued)

(56) References Cited

U.S. PATENT DOCUMENTS 5,519,773 A 5/1996 Dumas et al.
6,185,558 B1 2/2001 Bowman et al.
(Continued)

FOREIGN PATENT DOCUMENTS

EP 2109302 B1 9/2010
WO 2007112411 A2 10/2007
WO 2009065052 A1 5/2009

OTHER PUBLICATIONS

Sara Costa, "Call Flow—Talkdesk Support", <https://support.talkdesk.com/hc/en-us/articles/206196766-Call-Flow>, Jan. 18, 2018, 6 pages.
(Continued)

Primary Examiner — Harry S Hong
(74) Attorney, Agent, or Firm — Eric L. Sophir; Dentons US LLP

(57) ABSTRACT

A call management system of a call center retrieves customer demographic data associated with a customer identifier for an inbound caller, i.e., customer. A predictive model including a logistic regression model and tree based model determines a value prediction signal for the identified customer. Based on the value prediction signal determined, the predictive model classifies the identified customer into a first value group or a second value group. The call management system routes a customer classified in the first value group to a first call queue for connection to one of a first pool of call center agents who are authorized to present an offer to purchase a product, and routes a customer classified in the second value group to a second call queue for connection to one of a second pool of call center agents who are not authorized to present the offer to purchase the product.

20 Claims, 6 Drawing Sheets

Related U.S. Application Data

(60) Provisional application No. 62/687,130, filed on Jun. 19, 2018, provisional application No. 62/648,330, filed on Mar. 26, 2018, provisional application No. 62/648,325, filed on Mar. 26, 2018, provisional application No. 62/551,690, filed on Aug. 29, 2017.

(51) Int. Cl.
*G06N 20/00* (2019.01)
*G06Q 30/06* (2012.01)

(58) Field of Classification Search
CPC ............. H04M 3/5232; H04M 3/5235; H04M 2203/556; H04M 2203/558
See application file for complete search history.

(56) References Cited

U.S. PATENT DOCUMENTS

| | | | |
|---|---|---|---|
| 6,236,977 B1 | 5/2001 | Verba et al. | |
| 6,611,590 B1 | 8/2003 | Lu et al. | |
| 6,862,574 B1 | 3/2005 | Srikant et al. | |
| 6,879,683 B1 | 4/2005 | Fain et al. | |
| 6,970,554 B1 | 11/2005 | Peterson et al. | |
| 6,975,720 B1 | 12/2005 | Crook | |
| 7,023,979 B1 | 4/2006 | Wu et al. | |
| 7,035,811 B2 | 4/2006 | Gorenstein | |
| 7,047,206 B1 | 5/2006 | Schultze | |
| 7,228,284 B1 | 6/2007 | Vaillancourt et al. | |
| 7,275,083 B1 | 9/2007 | Seibel et al. | |
| 7,340,410 B1 | 3/2008 | Vaillancourt et al. | |
| 7,580,870 B1 | 8/2009 | Chang | |
| 8,355,934 B2 | 1/2013 | Virdhagriswaran | |
| 8,515,736 B1 | 8/2013 | Duta | |
| 8,548,843 B2 | 10/2013 | Folk et al. | |
| 8,571,951 B2 | 10/2013 | Diana et al. | |
| 8,577,014 B2 | 11/2013 | Brandt et al. | |
| 8,582,750 B2 | 11/2013 | Lee et al. | |
| 8,781,092 B2 | 7/2014 | Noble, Jr. | |
| 8,805,734 B2 | 8/2014 | Diana et al. | |
| 9,160,851 B2 | 10/2015 | Kugler et al. | |
| 9,263,038 B2 | 2/2016 | Flaks et al. | |
| 9,582,786 B2 | 2/2017 | Gubin et al. | |
| 9,635,181 B1 | 4/2017 | McGann et al. | |
| 9,680,996 B2 | 6/2017 | Kumar et al. | |
| 9,911,131 B1 | 3/2018 | Ross et al. | |
| 9,916,538 B2 | 3/2018 | Zadeh et al. | |
| 10,229,370 B1 * | 3/2019 | Merritt | G06N 20/00 |
| 10,235,628 B1 * | 3/2019 | Merritt | G06N 20/00 |
| 2002/0035504 A1 | 3/2002 | Dver et al. | |
| 2002/0082892 A1 | 6/2002 | Raffel et al. | |
| 2002/0128885 A1 | 9/2002 | Evans | |
| 2002/0138492 A1 | 9/2002 | Kil | |
| 2004/0081311 A1 | 4/2004 | Thompson | |
| 2004/0143473 A1 | 7/2004 | Tivey et al. | |
| 2004/0143476 A1 | 7/2004 | Kapadia et al. | |
| 2004/0143482 A1 | 7/2004 | Tivey et al. | |
| 2004/0143483 A1 | 7/2004 | Tivey et al. | |
| 2004/0143484 A1 | 7/2004 | Kapadia et al. | |
| 2005/0125334 A1 | 6/2005 | Masella et al. | |
| 2005/0195966 A1 | 9/2005 | Adar et al. | |
| 2006/0041500 A1 | 2/2006 | Diana et al. | |
| 2006/0155642 A1 | 7/2006 | Pettersen | |
| 2006/0200360 A1 | 9/2006 | Razletovskiy | |
| 2006/0229896 A1 | 10/2006 | Rosen et al. | |
| 2006/0265259 A1 | 11/2006 | Diana et al. | |
| 2007/0027746 A1 | 2/2007 | Grabowich | |
| 2007/0136164 A1 | 6/2007 | Roti et al. | |
| 2007/0174108 A1 | 7/2007 | Monster | |
| 2008/0120129 A1 | 5/2008 | Seubert et al. | |
| 2008/0162258 A1 | 7/2008 | Kala et al. | |
| 2008/0184270 A1 | 7/2008 | Cole et al. | |
| 2008/0201204 A1 | 8/2008 | Rose et al. | |
| 2008/0201205 A1 | 8/2008 | Rose et al. | |
| 2008/0294501 A1 | 11/2008 | Rennich | |
| 2009/0190744 A1 | 7/2009 | Xie et al. | |
| 2009/0190745 A1 | 7/2009 | Xie et al. | |
| 2009/0190749 A1 | 7/2009 | Xie et al. | |
| 2009/0190750 A1 | 7/2009 | Xie et al. | |
| 2009/0232294 A1 | 9/2009 | Xie et al. | |
| 2009/0234710 A1 | 9/2009 | Belgaied Hassine et al. | |
| 2010/0030578 A1 | 2/2010 | Siddique et al. | |
| 2010/0054453 A1 | 3/2010 | Stewart | |
| 2010/0114573 A1 | 5/2010 | Huang et al. | |
| 2010/0306249 A1 | 12/2010 | Hill et al. | |
| 2011/0153449 A1 | 6/2011 | Hite | |
| 2011/0196776 A1 | 8/2011 | Rash et al. | |
| 2011/0225082 A1 | 9/2011 | Diana et al. | |
| 2011/0258016 A1 | 10/2011 | Barak et al. | |
| 2011/0258067 A1 | 10/2011 | Rowell | |
| 2011/0307257 A1 | 12/2011 | Pereg et al. | |
| 2012/0053986 A1 | 3/2012 | Cardno et al. | |
| 2012/0066065 A1 | 3/2012 | Switzer | |
| 2012/0072232 A1 | 3/2012 | Frankham et al. | |
| 2012/0166445 A1 | 6/2012 | Chakrabarti et al. | |
| 2012/0203584 A1 | 8/2012 | Mishor et al. | |
| 2013/0006916 A1 | 1/2013 | McBride et al. | |
| 2013/0054480 A1 | 2/2013 | Ross et al. | |
| 2013/0085805 A1 | 4/2013 | Kursar et al. | |
| 2013/0215116 A1 | 8/2013 | Siddique et al. | |
| 2013/0218634 A1 | 8/2013 | Hills et al. | |
| 2013/0236002 A1 | 9/2013 | Jennings et al. | |
| 2014/0058831 A1 | 2/2014 | Duva et al. | |
| 2014/0149178 A1 | 5/2014 | Hedges | |
| 2014/0149339 A1 | 5/2014 | Title et al. | |
| 2014/0153703 A1 | 6/2014 | Desai et al. | |
| 2014/0201126 A1 | 7/2014 | Zadeh et al. | |
| 2014/0229406 A1 | 8/2014 | Puzis et al. | |
| 2014/0279722 A1 | 9/2014 | Singh et al. | |
| 2014/0289005 A1 | 9/2014 | Laing et al. | |
| 2014/0324529 A1 | 10/2014 | Bliss | |
| 2015/0046219 A1 | 2/2015 | Shavlik | |
| 2015/0154524 A1 | 6/2015 | Borodow et al. | |
| 2016/0071117 A1 | 3/2016 | Duncan | |
| 2016/0203498 A1 | 7/2016 | Das et al. | |
| 2016/0337795 A1 | 11/2016 | Nachman et al. | |
| 2017/0124581 A1 | 5/2017 | Wilson et al. | |
| 2017/0223190 A1 | 8/2017 | Mandel et al. | |
| 2017/0243137 A1 | 8/2017 | Mandel et al. | |

OTHER PUBLICATIONS

Raquel Florez-Lopez et al., "Marketing Segmentation Through Machine Learning Models", <https://pdfs.semanticscholar.org/ef05/502e936a94cafa0037c764bfb2212f385d97.pdf>, Social Science Computer Review, Oct. 8, 2008, 22 pages.

Sanford Gayle, "The Marriage of Market Basket Analysis to Predictive Modeling", <http://ai.stanford.edu/~ronnyk/WEBKDD2000/papers/gayle.pdf>, Published 2000, 6 pages.

Carlos Guestrin, "Unsupervised learning or Clustering—K-means Gaussian mixture models", <http://www.cs.cmu.edu/~guestrin/Class/10701-S07/Slides/clustering.pdf>, Apr. 4, 2007, 67 pages.

YongSeog Kim, "Customer Targeting: A Neural Network Approach Guided by Genetic Algorithms", <http://citeseerx.ist.psu.edu/viewdoc/download?doi=10.1.1.2.697&rep=rep1&type=pdf>, Feb. 1, 2005, 31 pages.

Dragomir Yankov et al., "Evaluation of Explore-Exploit Policies in Multi-result Ranking Systems", <https://arxiv.org/pdf/1504.07662.pdf>, Apr. 28, 2015, 9 pages.

Golbeck, Jenifer Ann, Computing and applying trust in we-based social networks, Diss. 2005.

Wang, Jyun-Cheng et al., "Recommending trusted online auction sellers using social network analysis". Expert Systems with Applications 34.3 (2008), pp. 1666-1679.

Shi-Jen Lin, et al., Combining ranking concept and social network analysis to detect collusive groups in online auctions, Expert Systems with Applications, vol. 30, Issue 10, pp. 9079-9086.

Paula Bernier; Genesys Interactive Voice Response; <http://www.genesys.com/solutions/customer-engagement/inbound/intelligent-voice-response>, Oct. 3, 2017; 3 pages.

(56) References Cited

OTHER PUBLICATIONS

Paula Bernier, Genesys Speech & Text Analytics; <http://www.genesys.com/solutions/employee-engagement/workforce-optimization/workforce-planning/speech-text-analytics>, Oct. 3, 2017; 4 pages.
W.F. Cody et al., The integration of business intelligence and knowledge management; IBM Systems Journal, vol. 41, No. 4; <https://pdfs.semanticscholar.org/3803/10409dd7822c6007d5c76808b8c28698e2cd.pdf>, Jul. 12, 2002; 17 pages.
Dawn Jutla; Enabling and Measuring Electronic Customer Relationship Management Readiness; Proceedings of the 34th Hawaii International Conference on System Sciences—2001; <http://www.computer.org/csdl/proceedings/hicss/2001/0981/07/09817023.pdf>, Aug. 7, 2002; 19 pages.
Gianmario Motta et al.; Forecasting in multi-skill call centers; 2013 Fifth International Conference on Service Science and Innovation (ICSSI); <http://ieeexplore.ieee.org/abstract/document/6599389/>, Oct. 24, 2013; 7 pages.
Haipeng Shen et al.; Forecasting Time Series of Inhomogenous Poisson Processes with Application to Call Center Workforce Management; The Annals of Applied Statistics; <https://www.unc.edu/~haipeng/publication/poissonSVD.pdf>, Jul. 25, 2008; 25 pages.
Evgeny Stepanov <https://www.researchgate.net/profile/Evgeny_Stepanov> et al.; Automatic Summarization of Call-center Conversations; Conference: IEEE Automatic Speech Recognition and Understanding Workshop (ASRU 2015); <https://www.researchgate.net/publication/282976793_Automatic_Summarization_of_Call-center_Conversations>, Dec. 2015; 3 pages.

\* cited by examiner

SYSTEM AND METHOD FOR MANAGING ROUTING OF CUSTOMER CALLS TO AGENTS

CROSS-REFERENCE TO RELATED APPLICATIONS

This application is a continuation of U.S. patent application Ser. No. 16/110,872, entitled "SYSTEM AND METHOD FOR MANAGING ROUTING OF CUSTOMER CALLS TO AGENTS," filed Aug. 23, 2018, which claims the benefit of U.S. Provisional App. No. 62/551,690, filed Aug. 29, 2017, claims the benefit of U.S. Provisional App. No. 62/648,325, filed Mar. 26, 2018, claims the benefit of U.S. Provisional App. No. 62/648,330, filed Mar. 26, 2018, and claims the benefit of U.S. Provisional App. No. 62/687,130, filed Jun. 19, 2018, all of which are incorporated by reference in their entirety.

TECHNICAL FIELD

The present disclosure relates generally to customer contact centers and their operation, and more particularly to a system and method for managing routing of customer calls to agents.

BACKGROUND

Customer contact centers provide an important interface for customers/partners of an organization to contact the organization. The contact can be for a request for a product or service, for trouble reporting, service request, etc. The contact mechanism in a conventional call center is via a telephone, but it could be via a number of other electronic channels, including e-mail, online chat, etc.

The contact center consists of a number of human agents, each assigned to a telecommunication device, such as a phone or a computer for conducting email or Internet chat sessions, that is connected to a central switch. Using these devices, the agents generally provide sales, customer service, or technical support to the customers or prospective customers of a contact center, or of a contact center's clients. Conventionally, a contact center operation includes a switch system that connects callers to agents. In an inbound contact center, these switches route inbound callers to a particular agent in a contact center, or, if multiple contact centers are deployed, to a particular contact center for further routing. When a call is received at a contact center (which can be physically distributed, e.g., the agents may or may not be in a single physical location), if a call is not answered immediately, the switch will typically place the caller on hold and then route the caller to the next agent that becomes available. This is sometimes referred to as placing the caller is in a call queue. In conventional methods of routing inbound callers to agents, high business value calls can be subjected to a long wait while the low business value calls are often answered more promptly, possibly causing dissatisfaction on the part of the high business value caller.

There is a need for a system and method for identifying high business value inbound callers at a call center during a time period in which inbound callers are awaiting connection to an agent. Additionally, there is a need to improve traditional methods of routing callers, such as "round-robin" caller routing, to improve allocation of limited call center resources to high business value inbound callers.

SUMMARY

Embodiments described herein can automatically route an inbound call from a customer to one of a plurality of queues (e.g., two queues) based on predicted value of the inbound telephone call. Upon identifying the customer, the process retrieves customer demographic data associated with a customer identifier for the identified customer. A predictive model determines a value prediction signal for the identified customer. Based on the value prediction signal determined, the predictive model classifies the identified customer into one of a first value group and a second value group. In the event the predictive model classifies the identified customer into the first value group, the call management system routes the identified customer to a first call queue for connection to one of a first pool of call center agents who are authorized to present the offer to purchase the product. In the event the predictive model classifies the identified customer into the second value group, the call management system routes the identified customer to a second call queue for connection to one of a second pool of call center agents who are not authorized to present the offer to purchase the product.

The predictive model can include a logistic regression model and a tree based model. In an embodiment, the predictive model determines the value prediction signal in real time by applying a logistic regression model in conjunction with a tree based model to the retrieved customer demographic data. In an embodiment, the logistic regression model employs $l_1$ regularization. In an embodiment, the logistic regression model employs $l_2$ regularization. In an embodiment, the tree based model is a random forests ensemble learning method for classification.

The value prediction signal can include one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product. In various embodiments, the a value prediction signal is a buy-only signal, a lapse-only signal, a buy-don't-lapse signal, or combination of these signals.

The customer identifier can include two or more of name of the identified customer, address of the identified customer, and zip code of the identified customer. In an embodiment, the customer management system obtains a customer identifier for the received customer call from caller information associated with the inbound calls. In an embodiment, the customer management system obtains a customer identifier for the received customer call via an automated telegreeter of a Voice Response Unit ("VRU") system. In an embodiment, the customer management system obtains a customer identifier for the received customer call from a third party directory service.

In one embodiment, a processor-based method comprises executing, by a processor, a predictive machine-learning model configured to determine, for each lead profile of a plurality of lead records stored in an internal database of a contact center, a value prediction signal by inputting customer demographic data, payment data, marketing costs data, and lapse data into a logistic regression model operating in conjunction with a tree based model, the predictive machine-learning model outputting a first subset of the plurality of lead records into a first value group and a second subset of the plurality of lead records into a second value group, wherein the value prediction signal comprises one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product, and wherein the predictive machine-learning model is continually trained using customer demographic data, updated payment data, updated marketing costs data, and updated lapse data; and running, by the processor, the predictive machine-learning model upon receiving a customer call from an identified customer at an inbound call receiving device of the contact center to: retrieve the customer demographic data for the identified customer; classify the identified customer into one of the first value group and the second value group; and direct the inbound call receiving device: in the event the processor classifies the identified customer into the first value group, to route the identified customer to a first call queue for connection to one of a first pool of call center agents; in the event the processor classifies the identified customer into the second value group, to route the identified customer to a second call queue for connection to one of a second pool of call center agents.

In another embodiment, a processor based method for managing customer calls within a call center comprises retrieving, by a processor, customer demographic data associated with a customer identifier for an identified customer in a customer call; determining, by a predictive model executing on the processor, a value prediction signal comprising one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; wherein the predictive model comprises a logistic regression model operating in conjunction with a tree based model; classifying, by the predictive model executing on the processor based on the value prediction signal determined by the predictive model, the identified customer into one of a first value group and a second value group, wherein the first value group comprises customers having a first set of modeled lifetime values, and the second value group comprises customers having a second set of modeled lifetime values, wherein modeled lifetime values in the first set of modeled lifetime values are higher than modeled lifetime values in the second set of modeled lifetime values; and in the event the classifying step classifies the identified customer into the first value group, routing, by the processor, the identified customer to a first call queue for connection to one of a first pool of call center agents; in the event the classifying step classifies the identified customer into the second value group, routing, by the processor, the identified customer to a second call queue for connection to one of a second pool of call center agents.

1. In a further embodiment, a system for managing customer calls within a call center, comprises an inbound telephone call receiving device for receiving a customer call to the call center; non-transitory machine-readable memory that stores historical information for leads of the call center comprising payment data, marketing costs data, and lapse data; a predictive modeling module that stores a predictive model of customer value, wherein the predictive model comprises a logistic regression model operating in conjunction with a tree based model; and a processor, configured to execute an inbound queue management module, wherein the processor in communication with the non-transitory machine-readable memory and the predictive models module executes a set of instructions instructing the processor to: retrieve customer demographic data associated with a customer identifier for an identified customer in the customer call received by the inbound telephone call receiving device, wherein the customer identifier comprises two or more of name of the identified customer, address of the identified customer, and zip code of the identified customer; retrieve from the non-transitory machine readable memory the historical information for leads of the call center comprising payment data, marketing costs data, and lapse data; determine a value prediction signal for the identified customer via analysis by the predictive model of the customer demographic data associated with the customer identifier for the identified customer and via analysis of historical payment data and lapse data of the call center; wherein the value prediction signal comprises one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; classify the identified customer into one of a first value group and a second value group based on the value prediction signal, wherein the first value group comprises customers having a first set of modeled lifetime values, and the second value group comprises customers having a second set of modeled lifetime values, wherein modeled lifetime values in the first set of modeled lifetime values are higher than modeled lifetime values in the second set of modeled lifetime values; and direct the inbound telephone call receiving device: in the event the inbound queue management module classifies the identified customer into the first value group, to route the identified customer to a first call queue for connection to one of a first pool of call center agents; in the event the inbound queue management module classifies the identified customer into the second value group, to route the identified customer to a second call queue for connection to one of a second pool of call center agents.

In another embodiment, a processor-based method comprises executing, by a processor, a predictive machine-learning model configured to determine, for each lead profile of a plurality of lead records stored in an internal database of a contact center, a value prediction signal by inputting customer demographic data, payment data and lapse data into a logistic regression model operating in conjunction with a tree based model, the predictive machine-learning model outputting a first subset of the plurality of lead records into a first value group and a second subset of the plurality of lead records into a second value group, wherein the value prediction signal comprises one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product, and wherein the predictive machine-learning model is continually trained using customer demographic data, updated payment data, and updated lapse data; and running, by the processor, the predictive machine-learning model upon receiving a customer call from an identified customer at an inbound call receiving device of the contact center: to retrieve the customer demographic data for the identified customer; to classify the identified customer into one of the first value group and the second value group; and to direct the inbound call receiving device: in the event the processor classifies the identified customer into the first value group, to route the identified customer to a first call queue for connection to one of a first pool of call center agents who are authorized to present the offer to purchase the product; in the event the processor classifies the identified customer into the second value group, to route the identified customer to a second call queue for connection to one of a second pool of call center agents who are not authorized to present the offer to purchase the product.

In another embodiment, a processor based method for managing customer calls within a call center comprises retrieving, by a processor, customer demographic data associated with a customer identifier for an identified customer in a customer call; determining, by a predictive model executing on the processor, a value prediction signal comprising one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; wherein the predictive model comprises a logistic regression model operating in conjunction with a tree based model; classifying, by the predictive model executing on the processor based on the value prediction signal determined by the predictive model, the identified customer into one of a first value group and a second value group; and in the event the classifying step classifies the identified customer into the first value group, routing, by the processor, the identified customer to a first call queue for connection to one of a first pool of call center agents who are authorized to present the offer to purchase the product; in the event the classifying step classifies the identified customer into the second value group, routing, by the processor, the identified customer to a second call queue for connection to one of a second pool of call center agents who are not authorized to present the offer to purchase the product.

In yet another embodiment, a system for managing customer calls within a call center, comprises an inbound telephone call receiving device for receiving a customer call to the call center; non-transitory machine-readable memory that stores historical information about leads, customers, and marketing costs of the call center; a predictive modeling module that stores a predictive model of customer value, wherein the predictive model comprises a logistic regression model operating in conjunction with a tree based model; and a processor, configured to execute an inbound queue management module, wherein the processor in communication with the non-transitory machine-readable memory and the predictive models module executes a set of instructions instructing the processor to: retrieve external third-party customer demographic data associated with a customer identifier for an identified customer in the customer call received by the inbound telephone call receiving device, wherein the customer identifier comprises two or more of name of the identified customer, address of the identified customer, and zip code of the identified customer; retrieve from the non-transitory machine readable memory the historical information about leads, customers, and marketing costs of the call center; determine a value prediction signal for the identified customer via analysis by the predictive model of the third-party customer demographic data associated with the customer identifier for the identified customer and via analysis of the historical information about leads, customers, and marketing costs of the call center; wherein the value prediction signal comprises one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; classify the identified customer into one of a first value group and a second value group based on the value prediction signal; and direct the inbound telephone call receiving device: in the event the inbound queue management module classifies the identified customer into the first value group, to route the identified customer to a first call queue for connection to one of a first pool of call center agents who are authorized to present the offer to purchase the product; in the event the inbound queue management module classifies the identified customer into the second value group, to route the identified customer to a second call queue for connection to one of a second pool of call center agents who are authorized to present the offer to purchase the product.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
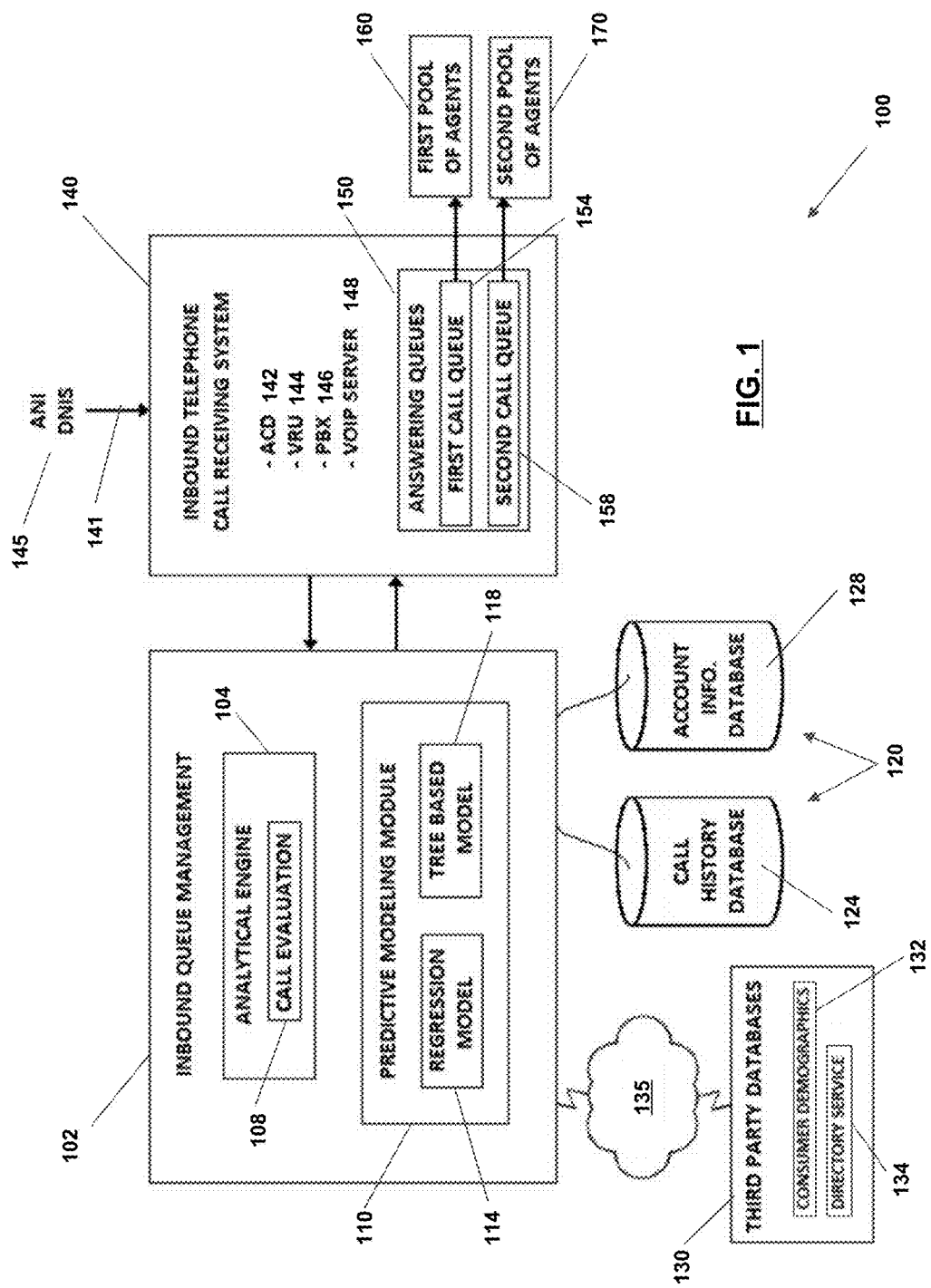
FIG. 1 is a system architecture for a customer management system of an inbound contact center, in accordance with an embodiment.

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following.

Contact routing at an inbound contact center can be structured in numerous ways. An individual employed by the contact center to interact with callers is referred to in the present disclosure as an "agent." Contact routing can be structured to connect callers to agents that have been idle for the longest period of time. In the case of an inbound caller where only one agent may be available, that agent is generally selected for the caller without further analysis. In another example routing an inbound call, if there are eight agents at a contact center, and seven are occupied with callers, the switch will generally route the inbound caller to the one agent that is available. If all eight agents are occupied with contacts, the switch will typically put the caller on hold and then route the caller to the next agent that becomes available. More generally, the contact center will set up a queue of inbound callers and preferentially route the longest-waiting callers to the agents that become available over time. A pattern of routing callers to either the first available agent or the longest-waiting agent is sometimes referred to as "round-robin" caller routing.

In general, when a caller is placed in a call queue, the caller's queue position is dependent upon the receipt time of the call at the vendor location. No consideration is given to the identity of the caller or the potential value of the call. While this is a democratic way to handle inbound calls, it may not be good for business. For instance, a large number of low business value calls may be in a queue when a high business value call is received. As a result, the high business value call is subjected to a long wait while the low business value calls are answered—with attendant dissatisfaction on the part of the high business value caller. When call centers have an inadequate number of skilled agents to handle all callers, such as at times of peak call volume, challenges of effectively handling high-value callers can be especially severe. The method and system of the present disclosure are intended to alleviate these problems.

Methods and systems described herein can automatically route an inbound call from a customer to one of a plurality of queues (e.g., two queues) based on predicted value of the inbound telephone call. Upon identifying the customer, the process retrieves customer demographic data associated with a customer identifier for the identified customer. A predictive model determines a value prediction signal for the identified customer. Based on the value prediction signal determined, the predictive model classifies the identified customer into one of a first value group and a second value group. In the event the predictive model classifies the identified customer into the first value group, the call management system routes the identified customer to a first call queue for connection to one of a first pool of call center agents who are authorized to present the offer to purchase the product. In the event the predictive model classifies the identified customer into the second value group, the call management system routes the identified customer to a second call queue for connection to one of a second pool of call center agents who are not authorized to present the offer to purchase the product.

Methods and systems described herein can employ a pre-sale predictive model relating to offer for sale of one or more product offered or supplied by a sponsoring organization of an inbound contact center. In various embodiments, the product(s) offered or supplied by a sponsoring organization require payments by the customer for a period following closing the sale, such as premiums to maintain in force an insurance policy or other financial product, or installment plans for product purchase. In various embodiments, the pre-sale prediction model incorporates information on a minimum period of time of customer payments required to achieve a beneficial transaction for the sponsoring organization, and uses this information in determining conditions for "lapse." The presale predictive model forecasts customer behavior to improve the probability of closing a sale of an offered product to an inbound customer, and to reduce the probability that the customer will lapse in payment for the purchased product.

The pre-sale predictive model can classify inbound callers into two, or more, value groups. In an embodiment, two value groups are modeled to model higher predicted value and lower predicted value, respectively, to the sponsoring organization. In various embodiments, this classification governs value-based routing of inbound telephone calls for response by agents, to allocate limited resources of the inbound contact center.

The inbound contact center is sometimes called simply a contact center or a call center. The individuals that interact with the contact center using a telecommunication device are referred to herein as callers, and alternatively are referred to as inbound callers, customers, prospective customers, or leads. In the present disclosure, a "customer" may be an existing customer or a prospective customer, and a prospective customer is alternatively called a lead. An individual employed by the contact center to interact with callers is referred to herein as an agent.

A pre-sale prediction model can incorporate information on a minimum period of time of customer payments required to achieve a beneficial transaction for the sponsoring organization. Failure of a customer to make payments over at least this minimum time period is sometimes referred to herein as "lapse." In an embodiment, pre-sale predictive models of the present disclosure incorporate a pre-determined period of time of payments following the sale of the product to define lapse. In certain embodiments, a sale of an insurance policy or other financial product requires only that the prospect complete an application to purchase the policy, sometimes called guaranteed acceptance. When selling via guaranteed acceptance, lapse rates for sold policies tend to be higher.

A key metric for value-based classification of a customer who has purchased a product is called a "lifetime value" of the product sale to that customer. In various embodiment, lifetime value includes the sum of all associated costs over product lifetime, netted against revenue for the product sale. The lifetime value for the product (insurance policy) sold to that customer is the net value of all premiums paid, over the sum of all such associated costs during that policy life.

In an embodiment involving sale of an insurance policy, associated costs over product lifetime include various sales acquisition costs, including marketing costs distributed across inbound calls, cost of operating the inbound contact center distributed across inbound calls, and commission at the time of sale. In this example, additional associated costs include cost of providing the insurance policy, and claims or death benefit. In various embodiments, total costs for a customer are modeled based on the customer's age, gender, policy face amount, and whether the policy is lapsed, and by applying formulas based on amortization of total marketing costs and operations costs. In an embodiment involving sale of an insurance policy, total revenue for a customer is modeled based on the customer's age, gender, policy face amount, and whether the policy is lapsed (if so, when). The model calculates expected total premium payments based on age and gender via lookup of mortality statistics.

Methods and systems described herein can identify lapse (e.g., for a given product or class of products) with a pre-determined period of time following sale of the product, and define lapse as failure of the customer to make payments for the product over at least this period of time. In various embodiments, this predetermined period of time is based upon modeling a minimum period of time for achieving a positive lifetime value for the product sale. This model compare total payments received with associated costs over different product lifetimes to determine the predetermined period. In one embodiment, product lifetime represents a period of time over in which the customer has continued to make purchase payments for the product, such as premiums or installment payments. In another embodiment, lifetime value is measured during the full term or life of an insurance policy or other financial instrument until all claims and death benefits have been paid, even if all premiums or other customer payments had been paid prior to this time.

FIG. 1 shows a system architecture for a customer management system 100, according to an illustrative embodiment. In the present disclosure, the customer management system 100 is sometimes called an inbound call center or inbound contact center, referring to its primary function of receiving inbound customer calls. Customer management system 100 includes an inbound queue management system 102, also called an inbound call management system. Inbound queue management system 102 manages assignment of inbound telephone calls for response by agents to multiple queues (e.g., two queues) based on predicted value of the inbound telephone call. Inbound queue management system 102 includes an analytical engine 104 containing a call evaluation sub-module 108, and a predictive modeling module 110 including a regression model 114 and a tree based model 118.

Inbound call management system 102 is interfaced with one or more internal databases 120 of the inbound contact center, such as call history database 124 and account information database 128. In an embodiment, analytical engine 104 interacts with external services, applications, and databases, such as third party databases 130, through one or more application programmable interfaces, an RSS feed, or some other structured format, via communication network 135. In the embodiment of FIG. 1, inbound queue management system 102 retrieves data from one or more third party databases 130, including a consumer demographic database 132 and a directory service database 134.

Predictive modeling module 110 builds one or more models that model behaviors of customers such as likelihood that a caller will purchase a product offered by the call center, and likelihood that the caller will lapse in payments for a purchased product. The predictive modeling module analyzes each inbound customer call using data associated with a customer identifier for the inbound caller. This customer identifier may be obtained from various sources by the call evaluation sub-module 108. Input data used in predictive modeling includes data retrieved from one or more of internal databases 120, and third party databases 130. This input data also may include data derived from the retrieved data that has been transformed by analytical engine 104 in order to facilitate predictive modeling, as described herein.

Databases 120 are organized collections of data, stored in non-transitory machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, and network databases. Database management systems may include MySQL, PostgreSQL, SQLite, Microsoft SQL Server, Microsoft Access, Oracle, SAP, dBASE, FoxPro, IBM DB2, LibreOffice Base, FileMaker Pro.

Analytical engine 104 can be executed by a server, one or more server computers, authorized client computing devices, smartphones, desktop computers, laptop computers, tablet computers, PDAs and other types of processor-controlled devices that receive, process, and/or transmit digital data. Analytical engine 104 can be implemented using a single-processor system including one processor, or a multi-processor system including any number of suitable processors that may be employed to provide for parallel and/or sequential execution of one or more portions of the techniques described herein. Analytical engine 104 performs these operations as a result of central processing unit executing software instructions contained within a computer-readable medium, such as within memory. In one embodiment, the software instructions of the system are read into memory associated with the analytical engine 104 from another memory location, such as from storage device, or from another computing device via communication interface. In this embodiment, the software instructions contained within memory instruct the analytical engine 104 to perform processes described below. Alternatively, hardwired circuitry may be used in place of or in combination with software instructions to implement the processes described herein. Thus, implementations described herein are not limited to any specific combinations of hardware circuitry and software.

Predictive modeling module 110 generates a value prediction signal representative of one or more of the following customer behaviors: (a) likelihood that the customer will accept an offer to purchase a product, (b) likelihood that the customer will lapse in payments for a purchased product, and (c) likelihood that the customer will accept an offer to purchase the product and will not lapse in payments for the purchased product. In certain embodiments, the predictive modeling module can predict more than one of these customer behaviors. For example, the predictive model may first determine the customer behavior (a) likelihood that the customer will accept an offer to purchase a product, followed by determining the customer behavior (b) likelihood that the customer will lapse in payments for a purchased product, in order to determine a value prediction signal. Based on this value prediction signal, the analytical module, in conjunction with the predictive modeling module, classifies each customer call into one of two, or more, value groups. Depending on the value group determined for each customer call, analytical engine 104 directs routing of the customer call to one of two or more answering queues 150 to await connection to an agent of the call center. In FIG. 1, two call queues 154 and 158 are shown. Value-based classification of inbound calls by inbound call management system 102 represents a significant improvement over traditional methods of routing callers, such as "round-robin" caller routing.

Inbound call management system 102 interfaces with an inbound telephone call receiving system 140. In customer management system 100, inbound call management system 102 and call receiving system 140 may be integrated in a single computing platform. Alternatively these systems may be based on separate computing platforms. In certain embodiments, the computing platform(s) are interfaced with computer-telephone integration ("CTI") middleware. In an embodiment, inbound telephone call receiving system 140 includes a telephony device that accepts inbound telephone calls through a telephony interface 141, such as conventional T1 or fiber interfaces. Inbound telephone call receiving system 140 accepts inbound telephone calls through interface 141 and obtains caller information associated with the inbound calls, such as Automatic Number Identification ("ANI") and Dialed Number Identification Service ("DNIS") information 145. ANI is a signaling system feature in which a series of digits, either analog or digital, are included in the call identifying the source telephone number of the calling device. DNIS is a telephone function that sends the dialed telephone number to an answering service. The DNIS need not be a telephone number associated with any physical location.

Inbound telephone call receiving system 140 may include an Automatic Call Distributor ("ACD") system 142; a Voice Response Unit ("VRU") system 144; a private branch exchange ("PBX") switch 146; a Voice over Internet Protocol ("VOIP") server 148; or any combination of such devices. In an embodiment, intrasite telephony access within the call center may be managed by a private branch exchange (PBX) switch 146. In an embodiment, PBX switch 146 operates in coordination with ACD 142 to distribute inbound calls customer service stations locally networked call center agents, such agents in first pool 160 and second pool 170. In further embodiments, inbound inquiries may include e-mail or instant messages that provide inquiry information based on login ID, e-mail address, IP or instant message address. In such an embodiment, the call center can gather additional information by an automated e-mail or instant message survey response, which can be used to request various types of customer identifier data.

An identified customer can be an inbound caller for which the customer management system 100 has obtained reliable identifying data. This data is used by inbound queue management system 102 to retrieve or identify data associated with that customer. In an embodiment, an identified customer is a customer for which the system 100 has reliably identified at least two of name, address, and zip code. In an embodiment, Voice Response Unit ("VRU") system 144 collects customer identifier data, such as name, address, and zip code, through automated interaction with the customer. In the present disclosure, this VRU data collection is sometimes called a telegreeter. For instance, VRU 144 may query an inbound caller to collect customer identifier information when ANI is not operative, e.g., when caller-ID is blocked. In an embodiment, inbound call management system 102 communicates with a third party directory service 134. Directory service 134 can provide additional caller identification information, such as name and address information, for inbound callers that are initially identified only by a telephone number. For an inbound caller that is a new lead of the enterprise, this additional caller identification information can be stored in Account Info database 128 as profile data for that lead.

Inbound telephone calls received through interface 141 are distributed to answering queues 150 for response by agents operating telephony devices. In the embodiment of FIG. 1, answering queues 150 include a first call queue 154 for response by one of the agents in a first pool 160 of call center agents, and a second call queue 158 for response by one of the agents in a second pool of agents 170. Although FIG. 1 depicts an embodiment of the present invention that orders inbound telephone calls, alternative embodiments apply inbound queue management to schedule other types of inbound inquiries, such as e-mail or instant message inquiries. In an embodiment, call center agents in agent pools 160 and 170 are groups of customer service representatives or agents deployed at workstations or agent devices communicatively coupled to call management system 100.

The agents are associated with a sponsoring organization that sells or supplies products with the assistance of the call center. In an embodiment, the organization generates sales of one or more product through advertisements that give a phone number to prospective customers, and the prospective customers call into the call center using this phone number. In various embodiments, the agents in first pool 160 are authorized to offer an advertised product to a prospective customer (inbound caller), while the agents in second pool 170 are not authorized to offer the advertised product. In the present disclosure, for an agent to be authorized to offer a product to a prospective customer or lead means that the agent is authorized to pursues a sale of the product to the lead.

A sponsoring organization for customer management system 100 is an insurance company or other financial services company, and the agents may include insurance agents. In some cases, an insurance agent may be associated with only a single insurance provider (sometimes referred to as a "captive" insurance agent). In other cases, an "independent" insurance agent may be associated with several different insurance providers. In an embodiment, the agents in the first pool 160 are licensed to sell insurance. In some cases, the producers may be licensed to sell different types of insurance products, might have different areas of expertise, needs, etc. In some embodiments, agents in the first pool 160 are selected for performance metrics related to sales. Agent sales performance may be measured by aggregate sales productivity metrics, as well as distributed performance metrics such as sales metrics by product types, etc.

While the agents in second pool 170 are not authorized to offer the product(s) to the inbound caller (prospective customer, or lead), these agents perform an important role in lead nurturing. Forwarding an inbound inquiry to a live agent with little or no wait time, sometimes referred to herein as a "warm transfer," has been observed to significantly increase probability of a successful sale to that customer in a later interaction. In some embodiments, agents in the second pool 170 are selected for skills related to agent-customer communications, which can be measured in indicators of customer satisfaction such as feedback on customer experiences.

Figure 2:
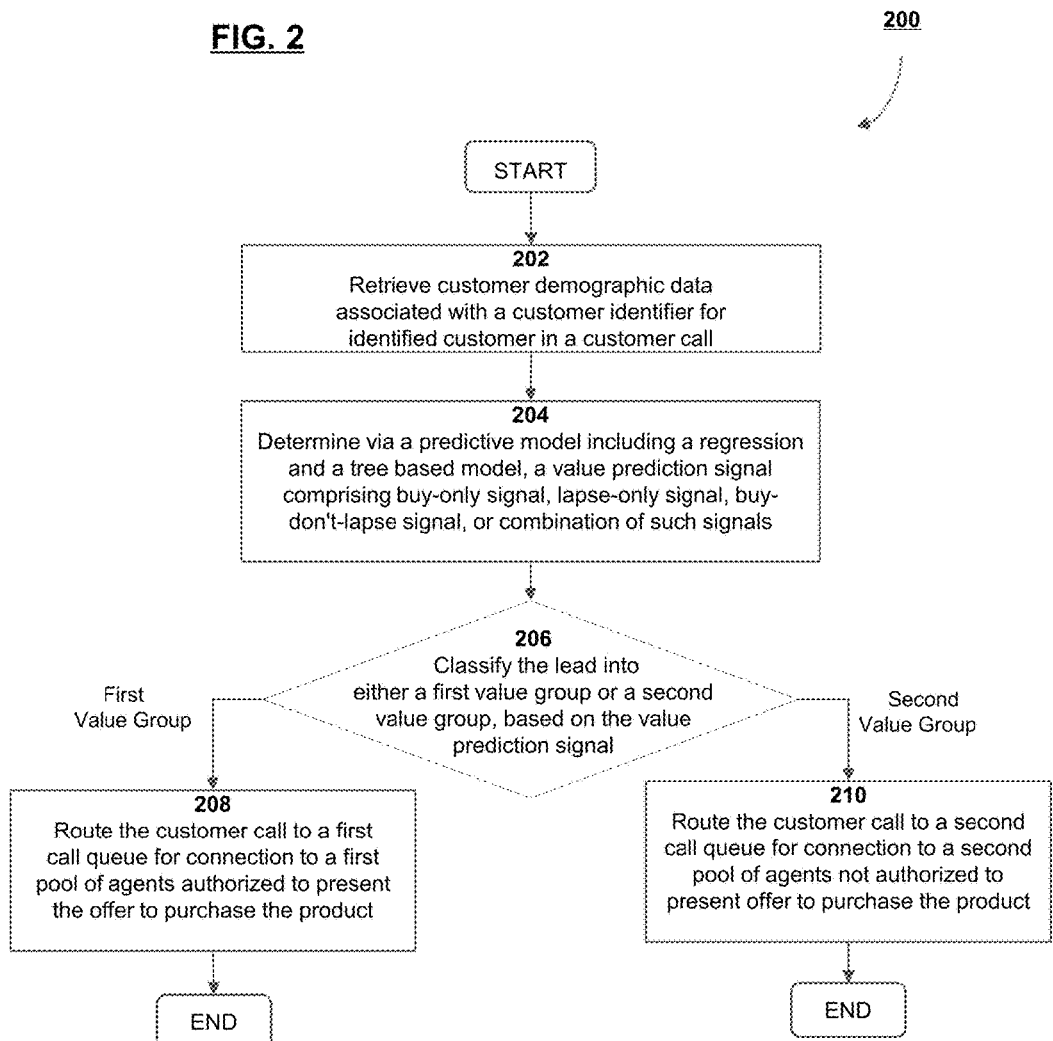
FIG. 2 illustrates a method for routing a customer call to an agent in accordance with an embodiment.

FIG. 2 is a flowchart of a call management process 200 for automatically routing an inbound call from a customer to one of a plurality of queues (e.g., two queues) based on predicted value of the inbound telephone call. Upon identifying the customer, the process retrieves customer demographic data associated with a customer identifier for the identified customer. A predictive model, including a logistic regression model operating in conjunction with a tree based model, determines a value prediction signal for the identified customer. Based on the value prediction signal determined, the predictive model classifies the identified customer into one of a first value group and a second value group. In the event the predictive model classifies the identified customer into the first value group, the call management system routes the identified customer to a first call queue for connection to one of a first pool of call center agents who are authorized to present the offer to purchase the product. In the event the predictive model classifies the identified customer into the second value group, the call management system routes the identified customer to a second call queue for connection to one of a second pool of call center agents who are not authorized to present the offer to purchase the product.

The plurality of steps included in process 200 may be performed by one or more computing devices or processors in the customer management system of FIG. 1. In an embodiment, the plurality of steps included in process 200 may be performed by an inbound queue management system 102 of a customer management system 100 of a call center, in operative communication with an inbound call receiving system 140 that receives a customer call of the identified customer.

The call management process 200 is initiated at step 202 in response to the customer management system 100 receiving an incoming customer call associated with a customer identifier. Customers may dial into the system via a public switched telephone network or via intrasite telephony. Additionally, inbound calls may be transmitted via the Internet using Web-enabled browsers, personal digital assistants or other network-enabled devices; via mobile cellular telephones (not shown), which may be Web-enabled, or connected via a mobile switching center.

In an embodiment, the customer identifier includes two or more of name of the identified customer, address of the identified customer, and zip code of the identified customer. In an embodiment, the customer management system obtains a customer identifier for the received customer call from caller information associated with the inbound calls, such as Automatic Number Identification ("ANI") and Dialed Number Identification Service ("DNIS") information. In an embodiment, the customer management system obtains a customer identifier for the received customer call via an automated telegreeter of a Voice Response Unit ("VRU") system. In an embodiment, the customer management system obtains a customer identifier for the received customer call from a third party directory service.

In an embodiment of step 202, the call management process retrieves the third party customer demographic data. In an embodiment, the third party customer demographic data is associated with the customer identifier contained in a third party demographic database. In an embodiment, the call management process builds a simplified data file from the third party demographic data indexed to the customer identifier as input to further steps of the process.

A step 204, the call management process determine via a value prediction signal via a predictive model that includes a logistic regression model and a tree based model. In various embodiments, the value prediction signal includes one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product. In various embodiments, the value prediction signal is a buy-only signal, a lapse-only signal, a buy-don't-lapse signal, or a combination of these signals.

In various embodiments of step 204, the value prediction signal determines a likelihood that the identified customer will lapse in payments for a purchased product by determining a likelihood that the identified customer will fail to make a payment for the purchased product during a predetermined time period following purchase of the purchased product. In an embodiment, the predetermined time period was previously determined by modeling lifetime value over varying durations of the time period following purchase of the purchased product.

In various embodiments of step 204, the regression model employs $l_1$ regularization. In various embodiments, the logistic regression model employs $l_2$ regularization. In various embodiments, the tree based model is a random forests ensemble learning method for classification.

In an embodiment, the call management process retrieves customer demographic data from a third party demographic database at step 202, and the logistic regression model of step 204 is trained on a full set of features of the third party demographic database.

At step 206, the call management process classifies the customer call (lead) into either a first value group or a second value group, based on the value prediction signal determined at step 204. In an embodiment of step 206, the first value group includes customers having a first set of modeled lifetime values, and the second value group includes customers having a second set of modeled lifetime values. The modeled lifetime values in the first set of modeled lifetime values are higher than modeled lifetime values in the second set of modeled lifetime values.

In the event step 206 classifies the identified customer into the first value group, at step 208 the call management process routes the identified customer to a first call queue for connection to one of a first pool of call center agents who are authorized to present the offer to purchase the product. In the event step 206 classifies the identified customer into the second value group, at step 210 the call management process routes the identified customer to a second call queue for connection to one of a second pool of call center agents who are not authorized to present the offer to purchase the product.

In various embodiments, the agents to which customers are routed at steps 208, 210 are associated with a sponsoring organization that sells or supplies products with the assistance of the call center. In an embodiment, the organization generates sales of one or more product through advertisements that give a phone number to potential or prospective customers, and the potential customers call into the call center using this phone number. In embodiments of step 206 in which the first value group includes leads having modeled lifetime values that are higher than modeled lifetime values of leads in the second value group, steps 208, 210 prioritize call center resources to pursue sale of offered product(s) to the higher-value group of leads.

Figure 3:
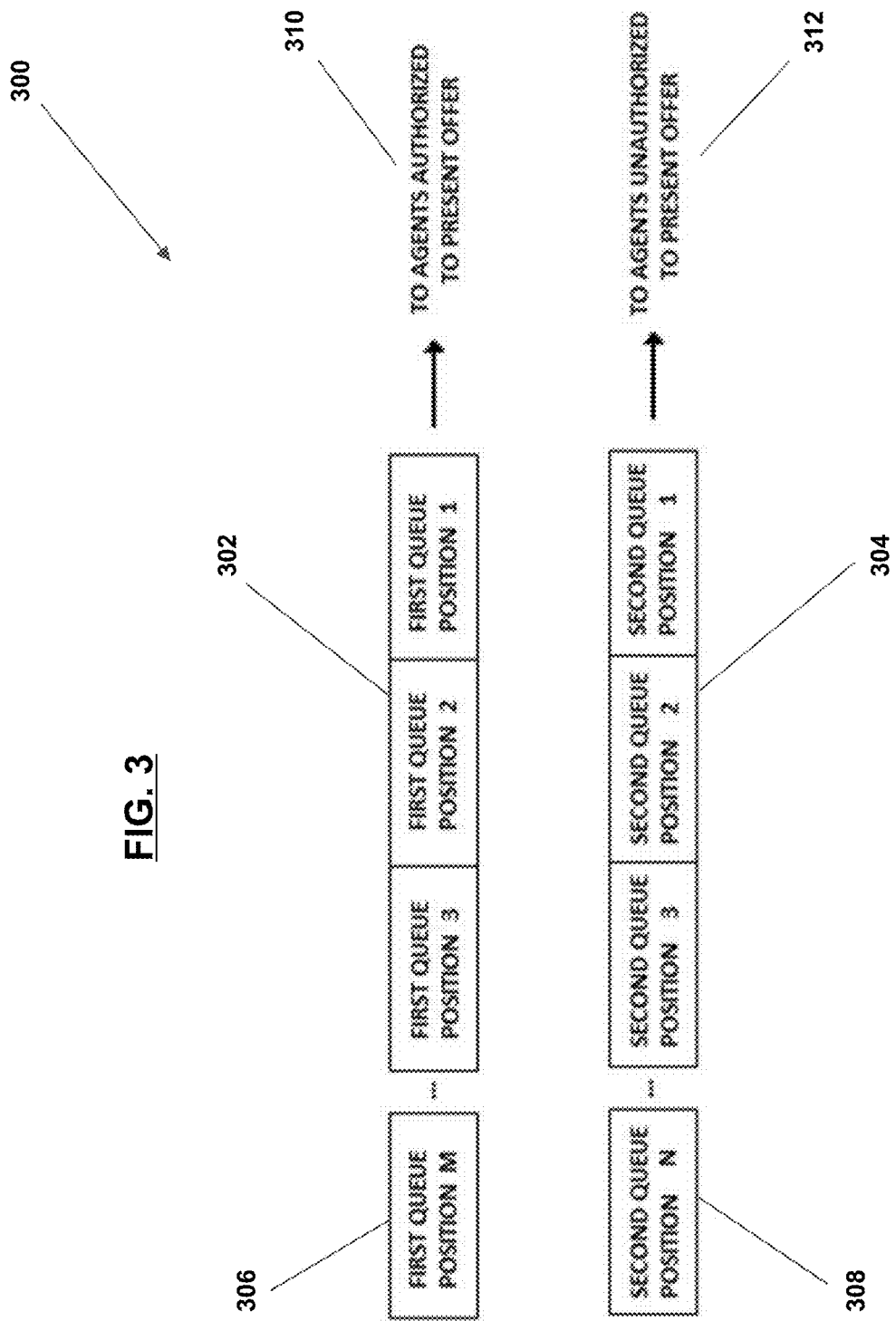
FIG. 3 illustrates a queue arrangement for routing prospective customers to agents of a call center, in accordance with an embodiment.

In certain embodiments of steps 206, 208, and 210, the classification of leads and routing of leads to the first call queue and second call queue, can permit adjustments to take into account matching of call center resources (agents) to leads at a given time, herein referred to as resource matching adjustments. As seen in the schematic diagram of a customer queue arrangement 300 at FIG. 3, first call queue 302 consists of a queue of length M (last queue position 306), to be connected to agents 310 in a first pool of agents who are authorized to present an offer to purchase the product. Second call queue 304 consists of a queue of length N (last queue position 308), to be connected to agents 312 in a second pool of agents who are not authorized to present an offer to purchase the product.

In various embodiments, resource matching adjustments can including adjustments to the binary classification model that classifies leads into first and second value groups. For example, if there are a disproportionately high number of agents in the first pool 310 compared to the second pool 312, the threshold for the first value group can be reduced to permit routing of additional leads to the first pool of agents. In another example, if there are a disproportionately low number of agents in the first pool 310 compared to the second pool 312, the threshold for the first value group can be raised to permit routing of fewer leads to the first pool of agents.

In various embodiments, resource matching adjustments can include adjustments to the first queue of leads and second queue of leads. Such adjustments may take into account the total population of leads awaiting connection to call center agents, i.e., the leads in both queues 302 and 304 at a given time. At certain times there may be an unusual distribution of leads between the first and second queues, e.g., a disproportionately high number of leads in the first queue (M is unusually high relative to N) or a disproportionately low number of leads in the first queue (M is unusually low relative to N). To address these unusual distributions, one or more customer may be shifted from the first queue 302 to the second queue 304, or one or more customer may be shifted from the second queue 304 to the first queue 302.

Both types of resource matching adjustment, i.e., adjustment of the binary classification model, and direct adjustment of the call queues, may be combined.

In an embodiment, customer management system 100 utilizes data from both internal and external sources in pre-sale predictive modeling of sale of a financial product (e.g., insurance policy). The data includes internal data 120 of the call center that tracks historical information about leads, customers, and marketing costs of the call center, including historical sales and lapse information. In an embodiment, these internal databases use rmm_analytics schema in data warehouse software. In an embodiment, internal databases 120 use rmm_analytics schema in VERTICA to generate a table of enterprise customer data. In another embodiment, internal databases 120 use rmm_analytics schema to generate additional data tables, such as a table of historical lead and customer data, and a table of marketing costs data.

In an embodiment, rmm_analytics schema include sales and lapse data for current and/or historical leads of the enterprise, which data is used in building predictive models of the present disclosure. In an illustrative embodiment, a paid_flag indicates policy payments and a related field shows the amount of each payment. In the present disclosure these data are called payment data. In an illustrative embodiment, either a lapse_flag or surrendered_flag indicate that a policy has lapsed. In the present disclosure these data are called lapse data. In an embodiment, date fields are used for filtering data by date range. In an embodiment, information about leads, customers, and marketing costs was used to model a pre-determined period of time of payments following the sale of the product that defines lapse. In an embodiment, for the purpose of pre-sale predictive modeling of sale of an insurance policy, this modeling resulted in defining lapse as failure of the customer to maintain a purchased policy in force for at least 18 months.

In building the predictive models of the present disclosure, model datasets may have populations in the hundreds of thousands or millions of individuals. Model datasets may include training datasets and testing datasets. Filtering techniques can be applied to eliminate false data and for de duplicating, reducing the number of records but significantly improving quality of model datasets. In an embodiment, date-filtered data such as payment data and lapse data within an older date range are used for building a training data set, and date-filtered data within a more recent range are used for building a test data set. In an embodiment, predictive machine-learning models of the present disclosure are continually trained using updated payment data, lapse data, and customer demographic data.

In an embodiment, in building predictive models, rmm_analytics schema in VERTICA are filtered based on the flow of historical leads through the inbound call center routing process. In an embodiment, the data are filtered to select only historical leads that were connected to a live agent; in the present disclosure this flow is sometimes called a "warm transfer." Applicant has observed that building predictive models based on a population limited to warm transfers can improve performance of models for predicting sales and lapse behaviors.

In the embodiment, data used in predictive modeling also include data retrieved from a customer demographic database 132 to obtain information about leads. In an embodiment, customer demographic data includes individual level data on leads. In various embodiments, as a prerequisite to using data in pre-sale predictive modeling of a given inbound caller (lead), analytical engine 104 associates the customer demographic data with a customer identifier for the lead. In an embodiment, customer demographic data used in pre-sale modeling of a lead requires an exact match of name and address.

In an embodiment, customer demographic data also includes data using zip-level features of the system, which provide a coarser representation in building the predictive model. Such zip-level features employ variables in the system that have resolution at the zip-level for each individual in the zip code. In an embodiment, zip-level data for individual income is associated with a median value of income in the system for each individual in the zip code. Reasons for using zip-level data in predictive modeling include, for example, lack of a statistically significant difference in model performance as a function of any polymer match score threshold; simplicity of collecting only the name and zip code in the telegreeter process; and privacy considerations as to individual-level data.

In various embodiments embodiment, in predictive modeling of inbound callers, inbound queue management system 102 uses a lookup tool (e.g., polymer) that analyzes customer identifiers of inbound callers in real time to retrieve customer data, such as customer demographic data, matched to the customer identifiers. In an embodiment, the lookup tool is a lightweight, extensible search engine or API, implemented in the Python object-oriented programming language, https://www.python.org/. In various embodiments, the lookup tool performs real time matching of data in the customer demographic database 132 to a customer identifier for a given lead. In various embodiments, as a preliminary to using data in real-time predictive modeling of inbound callers, inbound queue management system 102 indexes the data by applying the search engine to customer identifiers in customer training data, and stores this index as an internal enterprise database 120.

In an embodiment, inbound queue management system 102 labels each data element as continuous (including interval), binary, ordinal, or nominal (categorical). For use in a logistic regression model 114, variables that have lookup fields are converted to integers. Following feature transformation of the variables, the final view outputs each variable with human-readable names (if known), and a tag at the end of the variable name. End tags for transformed variable names include:

_binary: either 0 or 1
_ordinal_to_binary: either 0 or 1, where null values are mapped to 0

_flat_binary: mapped from a string field like "01001000" into multiple fields
_ordinal: as an integer, with null values left null
_interval: as an integer, with null values left null
_continuous: as an integer, with null values left null
_nominal: as an integer, with null values mapped to an additional integer By applying the feature transformation rules described above, analytical engine 104 builds a simplified input data file from data retrieved. This simplified input data file facilitates pre-sale predictive modeling with a binary target.

Predictive modeling module 110 builds both a regression model 114 and a tree based model 118. In an embodiment, the predictive modeling module 110 trains a logistic regression model 114 with $l_1$ regularization on the full set of features of the database. Use of logistic regression for classification problems provides performance advantages over standard linear regression, because application of the logistic function to the raw model score maps the output precisely from 0→1 while providing a smooth decision boundary. In an embodiment, the logistic regression model with $l_1$ regularization utilizes LASSO (Least Absolute Shrinkage and Selection Operator), a regression analysis method that performs both variable selection and regularization to enhance prediction accuracy and ease of interpretation of the resulting statistical model.

$l_1$ regularization provides the benefit of simplifying the selection of features through the model training process by constraining features with lower correlation to have 0 weight. The general form for a linear model can be indicated as:

$$\hat{y}(w,x) = w_o + w_1 x_1 + \ldots + w_p x_p$$

for $\hat{y}$ to be predicted from data points in the array x by learned coefficients w. The $l_1$ regularization is achieved by adding a term to the cost function, as follows:

$$\min_w \frac{1}{2n_{samples}} \|Xw - y\|_2^2 + a\|w\|_1$$

with regularization weight α. Applicant observed in training a logistic regression model with $l_1$ regularization, that run time of training increases rapidly with greater regularization parameters, with best model performance at low values of the regularization parameter α. In an embodiment, the logistic regression model with $l_1$ regularization sets the regularization parameter α using cross-validation, with best-performing values typically around 0.005-0.01.

In another embodiment, regression model employs logistic regression with $l_2$ regularization, sometimes called ridge regression, according to the formula:

$$\min_w \frac{1}{2n_{samples}} \|Xw - y\|_2^2 + a\|w\|_2$$

In the $l_2$ regularization model, as in the $l_1$ regularization model, the regularization weight α is set by cross validation. In an embodiment, a logistic regression model with $l_2$ regularization uses a backward feature selection procedure to select an optimal number of features. This feature selection procedure is the RFECV method for recursive feature elimination in Scikit-learn (a software machine-learning library for the Python programming language, available at https://github.com/scikit-learn/scikit-learn).

In various embodiments, both $l_1$ and $l_2$ regularization models fit a regularization hyperparameter using five folds for cross validation and searching across the seven parameters: [0, 0.001, 0.005, 0.01, 0.1, 0.5, 1]. In repeated iterations of model training, this range is restricted around previously successful settings.

In an embodiment, the tree based model 118 is a random forests model. Random forests is a class of ensemble methods used for classification problems. Random forests models work by fitting an ensemble of decision tree classifiers on sub samples of the data. Each tree only sees a portion of the data, drawing samples of equal size with replacement. Each tree can use only a limited number of features. By averaging the output of classification across the ensemble, the random forests model can limit over-fitting that might otherwise occur in a decision tree model.

In an embodiment, the tree-based model 118 uses the random forests model in Python's scikit-learn. In an embodiment, the tree-based model 118 uses the following parameters in the scikit-learn random forests model:

Maximum tree depth: 3 or ∞, set with max_depth.
Maximum number of features considered when looking for the best split: 3→6, set with max_features.
Minimum number of samples required to split a node of the tree: 2→11, set with min_samples_split.
Minimum number of samples to be a leaf node: 1→11, set with min_samples_leaf.
Number of trees in the forest: 100 or 200, set by n_estimators.
Whether to sample with replacement for the data seen by each tree: true or false, set by bootstrap.
Function to measure quality of a split: Gini or Entropy (information gain), set as criterion.

In an embodiment, for each lead, the pre-sale prediction model generates a value prediction signal indicative of potential value of a sales transaction for that lead. The predictive model can provide various types of value prediction signal including, for example: (a) buy-only signal, representative of the likelihood that the customer will accept the offer to purchase the product; (b) lapse-only signal representative of the likelihood that the customer will lapse in payments for the purchased product; (c) buy-don't-lapse signal representative of the likelihood that the customer will accept the offer to purchase the financial product and will not lapse in payments for the purchased product; as well as predictive models providing combinations of these signals.

Predictive models 110 effect a degree of feature selection. In various embodiments, predictive models 110 identify high importance features that have the most pronounced impact on predicted value. Different types of model may identify different features as most important. For example, a model based upon a buy-only signal may identify different leading features than a model based upon a lapse-only signal.

TABLE 1

Features from $l_1$ buy-don't-lapse model

| Importance | Feature |
| --- | --- |
| −2.7125 | expectant_parent_nominal |
| −0.3126 | recent_divorce_nominal_0 |
| −0.2634 | credit_card_new_issue_nominal_0 |
| −0.1438 | gender_input_individual_nominal_0 |
| 0.1117 | socially_influenced_ordinal |
| 0.0890 | home_length_of_residence_interval |
| −0.0757 | likely_investors_nominal_0 |

TABLE 1-continued

Features from $l_1$ buy-don't-lapse model

| Importance | Feature |
|---|---|
| −0.0667 | vacation_travel_international_would_enjoy_ordinal_to_binary |
| 0.0637 | total_liquid_investible_assets_fin_ordinal |
| −0.0632 | new_mover_nominal_0 |
| −0.0518 | single_parent_ordinal_to_binary |
| −0.0517 | vacation_travel_time_share_have_taken_ordinal_to_binary |
| −0.0455 | investments_real_estate_ordinal_to_binary |
| 0.0438 | investments_stocks_bonds_ordinal_to_binary |
| 0.0429 | obtain_life_insurance_along_with_loan_mortgage_installment_payments_ordinal |

Table 1 shows the top 15 features from an $l_1$ buy-don't-lapse model. The most important features are identified by the highest absolute value of the importance coefficient. The most important feature of this target is the expectant_parent_nominal variable, where a 0 corresponds to not expectant. Positive and negative signs of the importance coefficient indicate whether an increases, or a decrease, of the feature increases likelihood of the target. This data indicates that non-expectant parents are less likely to buy, and less likely to lapse.

Figure 4:
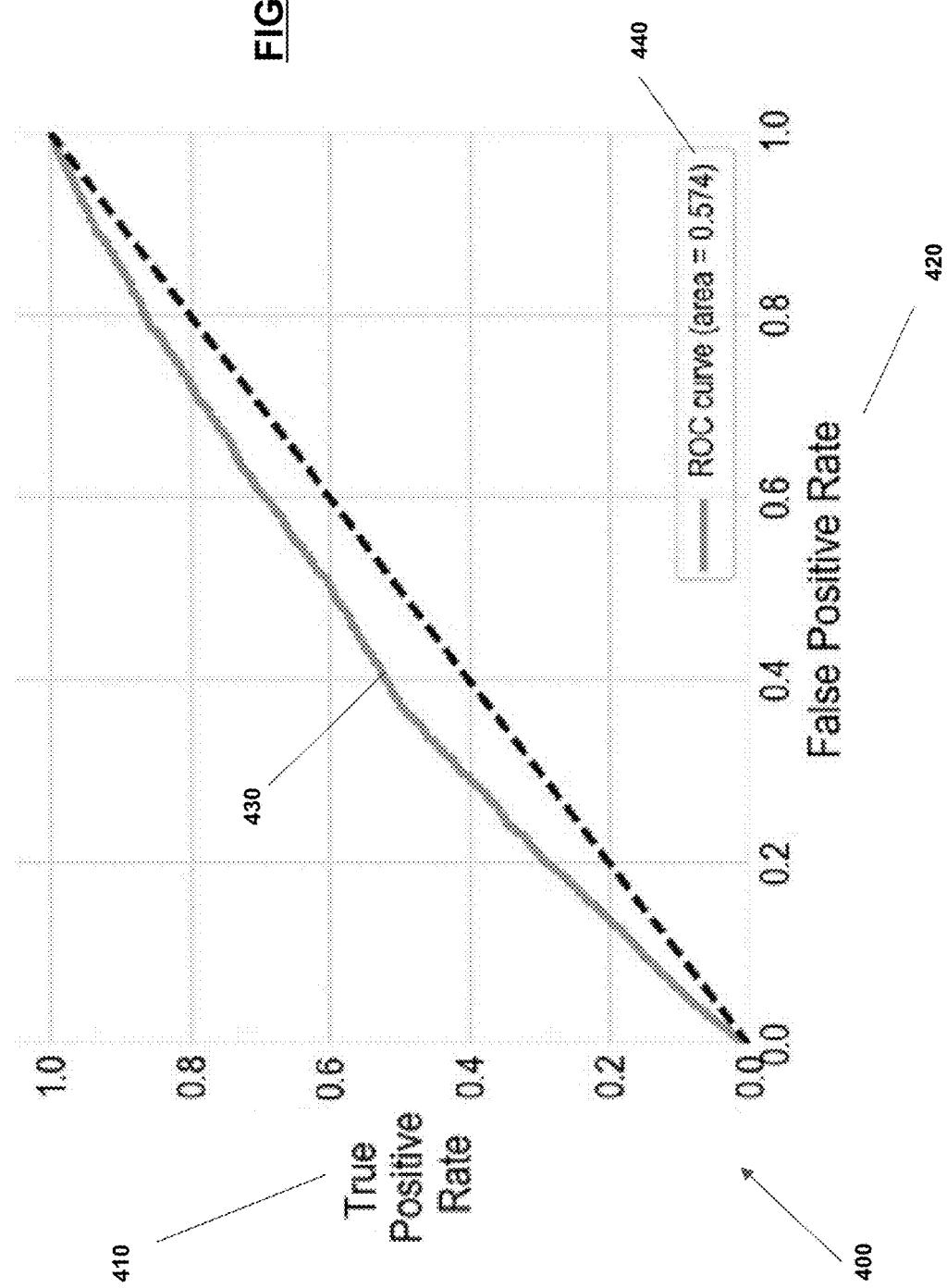
FIG. 4 is a graph of a receiver operator curve (ROC) for a value prediction model, in accordance with an embodiment.

In an embodiment, in building the pre-sale predictive model 110, the call center evaluates performance of prospective models, such as test models, for efficacy in predicting buying behavior and/or lapse behavior. In an embodiment, prospective models are tested for the area under the curve (AUC) of a receiver-operator curve (ROC). FIG. 4 is an example 400 of an ROC curve 430. The receiver-operating characteristic (ROC) curve plots the true positive rate (Sensitivity) 410 as a function of the false positive rate (100-Specificity) 420 for different cut-off points. Each point on the ROC curve 430 represents a sensitivity/specificity pair corresponding to a particular decision threshold. An ROC curve with a higher area under the curve (AUC) generally indicates a higher-performing model. The ROC 400 of FIG. 4 was obtained in testing a logistic regression model with $l_1$ regularization on the lapse-only signal, and has an AUC of 0.574, indicating a high-performing model.

Figure 5:
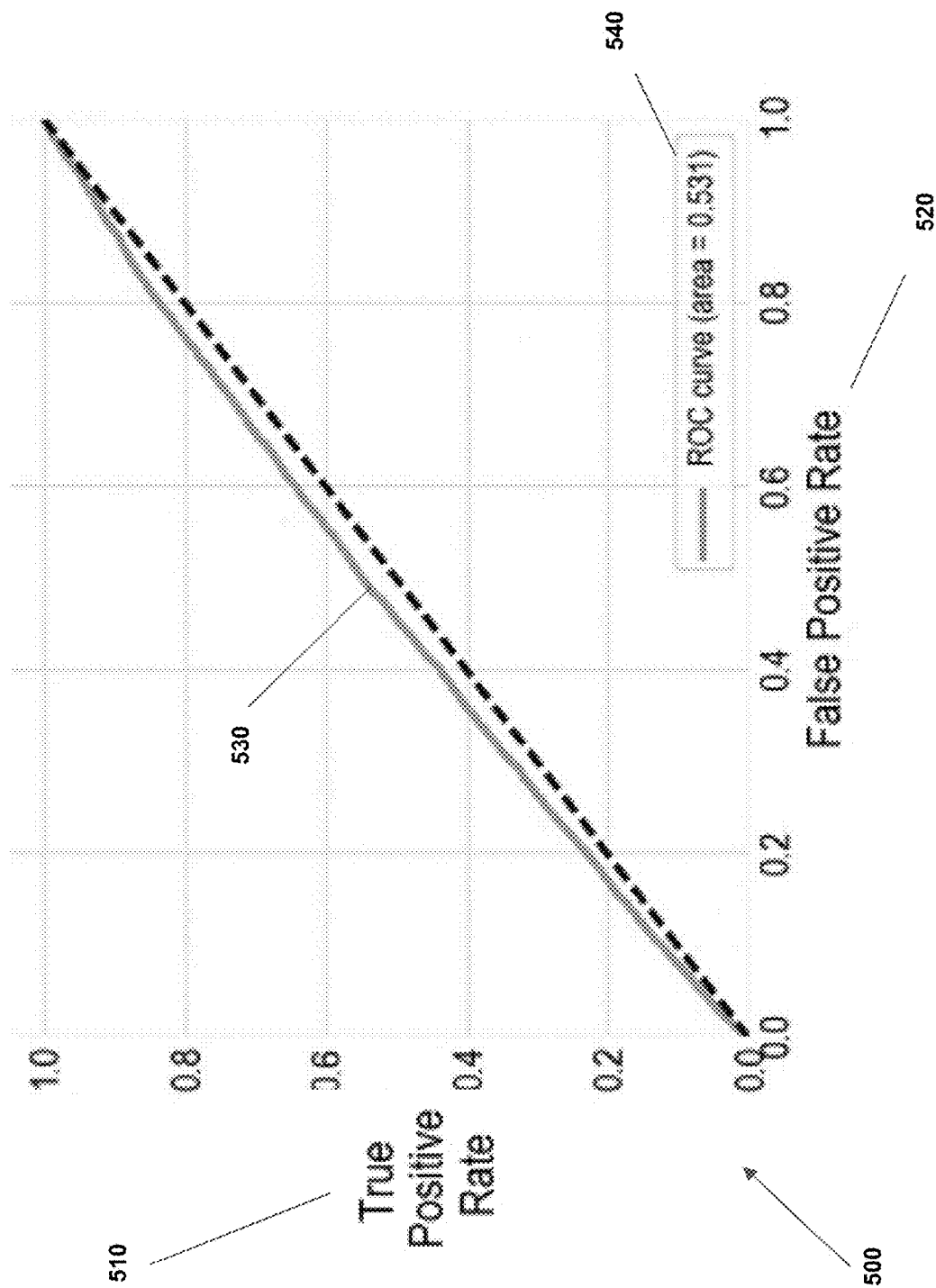
FIG. 5 is a graph of a receiver operator curve (ROC) for a value prediction model, in accordance with an embodiment.

FIG. 5 is another example of a receiver-operator curve (ROC) 500, obtained by testing a logistic regression model with 12 regularization on the buy-only signal trained using all leads. (Sensitivity) 510 as a function of the false positive rate (100-Specificity) 520 for different cut-off points. Each point on the ROC curve 530 represents a sensitivity/specificity pair corresponding to a particular decision threshold. ROC 500 has an area under the curve (AUC) 540 of 0.531.

Figure 6:
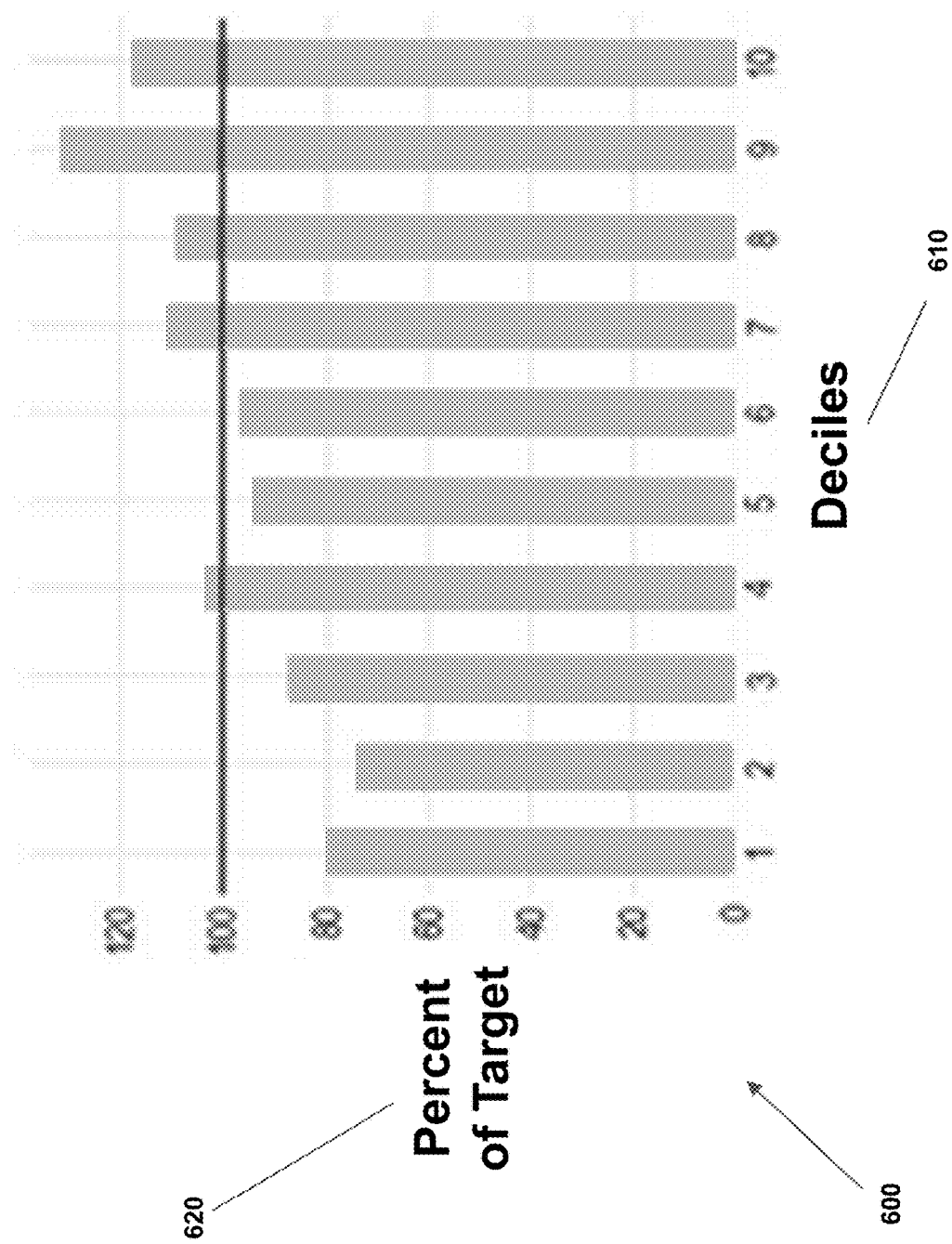
FIG. 6 is a graph of lift across deciles of model scores for a value prediction model, in accordance with an embodiment.

In an embodiment, prospective predictive models are tested for performance by measuring lift across deciles. Lift is a measure of the degree of improvement of a predictive model over analysis without a model. For a binary classifier model, decile lift is applied to deciles of the target records ranked by predicted probability. FIG. 6 is a graph of lift across deciles of model scores 600 for a logistic regression model with $l_1$ regularization on the lapse-only signal, trained on zip-level features. Percent of target values 620 across deciles 610 show a significant impact of the model on lapse rate.

In an embodiment, prospective predictive models are tested for performance by measuring improvements in buying behavior and/or reductions on lapse rate. In various embodiments, these measurements are carried out with different levels of resource constraint of the call center, measured by call center agent resources in view of inbound call volume. For example, a 70% resource constraint involves agent resources at a 70% level of resources in view of call volume relative to full resources.

In some embodiments, the pre-sale predictive model incorporated a logistic regression model with $l_1$ regularization, for the lapse-only target. In one embodiment, this model was trained on all customers with individual-level data. In another embodiment, this model was trained on all customers with zip-level data. At a 70% resource constraint, the model with individual-level data was tested to provide an 11% reduction in lapse rate, while the model with zip-level data was tested to provide an 8% reduction in lapse rate. At a 60% resource constraint, the model with individual-level data was tested to provide a 14% reduction in lapse rate, while the model with zip-level data was tested to provide an 11% reduction in lapse rate.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A processor-based method, comprising:
   receiving a customer call from an identified customer at an inbound call receiving device;
   in response to receiving the customer call:
      retrieving, by a processor, customer demographic data for the identified customer;
      executing, by the processor, a predictive machine-learning model configured to determine, for each lead profile of a plurality of lead records, a value prediction signal by inputting the customer demographic data for the identified customer, payment data, marketing costs data, and lapse data into a logistic regression model operating in conjunction with a tree based model, the predictive machine-learning model outputting a first subset of the plurality of lead records into a first value group and a second subset of the plurality of lead records into a second value group,
         wherein the value prediction signal comprises one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product, and
         wherein the predictive machine-learning model is continually trained using updated customer demographic data, updated payment data, updated marketing costs data, and updated lapse data;
      classifying, by the processor, the identified customer into one of the first value group and the second value group; and
      directing, by the processor, the inbound call receiving device,
         to route the identified customer to a first call queue for connection to one of a first pool of call center agents in the event the processor classifies the identified customer into the first value group; and
         to route the identified customer to a second call queue for connection to one of a second pool of call center agents in the event the processor classifies the identified customer into the second value group.

2. The processor based method according to claim 1, wherein the first value group comprises customers having a first set of modeled lifetime values, and the second value group comprises customers having a second set of modeled lifetime values, wherein modeled lifetime values in the first set of modeled lifetime values are higher than modeled lifetime values in the second set of modeled lifetime values.

3. The processor based method according to claim 2, wherein the predictive machine-learning module is configured to determine a minimum period of time of payments following sale of the purchased product that results in a positive modeled lifetime value of the product sale based on the updated customer demographic data, the updated payment data and the updated marketing costs data.

4. The processor based method according to claim 3, wherein the predictive machine-learning module identifies lapse for a given purchased product with minimum period of time of payments following sale of the given purchased product that results in a positive modeled lifetime value of the product sale.

5. The processor based method according to claim 1, wherein the logistic regression model comprises one of a logistic regression model with $l_1$ regularization and a logistic regression model with $l_2$ regularization.

6. The processor based method according to claim 1, wherein the tree based model is a random forests ensemble learning method for classification.

7. A processor based method for managing customer calls within a call center, comprising:
   retrieving, by a processor, customer demographic data associated with a customer identifier for an identified customer in a customer call;
   determining, by a predictive model executing on the processor, a value prediction signal comprising one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; wherein the predictive model determines the value prediction signal by inputting the customer demographic data associated with the customer identifier for the identified customer in the customer call into a logistic regression model operating in conjunction with a tree based model;

classifying, by the predictive model executing on the processor based on the value prediction signal determined by the predictive model, the identified customer into one of a first value group and a second value group, wherein the first value group comprises customers having a first set of modeled lifetime values, and the second value group comprises customers having a second set of modeled lifetime values, wherein modeled lifetime values in the first set of modeled lifetime values are higher than modeled lifetime values in the second set of modeled lifetime values; and in the event the classifying step classifies the identified customer into the first value group, routing, by the processor, the identified customer to a first call queue for connection to one of a first pool of call center agents;

in the event the classifying step classifies the identified customer into the second value group, routing, by the processor, the identified customer to a second call queue for connection to one of a second pool of call center agents.

8. The processor based method according to claim 7, wherein the predictive machine-learning model configured to determine the value prediction signal by inputting payment data, marketing costs data, lapse data, and the customer demographic data associated with the customer identifier for the identified customer in the customer call into the logistic regression model operating in conjunction with a tree based model.

9. The processor based method according to claim 8, wherein the predictive machine-learning module is configured to determine a minimum period of time of payments following sale of the purchased product that results in a positive modeled lifetime value of the product sale based on the customer demographic data associated with the customer identifier for the identified customer in the customer call, the payment data and the marketing costs data.

10. The processor based method according to claim 9, wherein the predictive machine-learning module identifies lapse for a given purchased product with minimum period of time of payments following sale of the given purchased product that results in a positive modeled lifetime value of the product sale.

11. The processor based method according to claim 7, wherein the customer demographic data associated with the customer identifier for the identified customer in the customer call comprises third party demographic data associated with the customer identifier contained in a third party demographic database, further comprising the step of building a simplified data file from the third party demographic data indexed to the customer identifier as input to the determining the value prediction signal.

12. The processor based method according to claim 7, wherein the retrieving step comprises analyzing the customer identifier in real time via a lookup tool to retrieve the customer demographic data associated with the customer identifier for the identified customer in the customer call.

13. The processor based method according to claim 7, wherein the logistic regression model employs one of $l_1$ regularization and $l_2$ regularization.

14. The processor based method according to claim 7, wherein the tree based model is a random forests ensemble learning method for classification.

15. A system for managing customer calls within a call center, comprising:

an inbound telephone call receiving device for receiving a customer call to the call center;

non-transitory machine-readable memory that stores historical information for leads of the call center comprising payment data, marketing costs data, and lapse data;

a predictive modeling module that stores a predictive model of customer value, wherein the predictive model comprises a logistic regression model operating in conjunction with a tree based model; and a processor, configured to execute an inbound queue management module, wherein the processor in communication with the non-transitory machine-readable memory and the predictive models module executes a set of instructions instructing the processor to:

retrieve customer demographic data associated with a customer identifier for an identified customer in the customer call received by the inbound telephone call receiving device, wherein the customer identifier comprises two or more of name of the identified customer, address of the identified customer, and zip code of the identified customer;

retrieve from the non-transitory machine readable memory the historical information for leads of the call center comprising payment data, marketing costs data, and lapse data;

determine a value prediction signal for the identified customer via analysis by the predictive model of the customer demographic data associated with the customer identifier for the identified customer and via analysis of historical payment data and lapse data of the call center; wherein the value prediction signal comprises one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product;

classify the identified customer into one of a first value group and a second value group based on the value prediction signal, wherein the first value group comprises customers having a first set of modeled lifetime values, and the second value group comprises customers having a second set of modeled lifetime values, wherein modeled lifetime values in the first set of modeled lifetime values are higher than modeled lifetime values in the second set of modeled lifetime values; and direct the inbound telephone call receiving device:

in the event the inbound queue management module classifies the identified customer into the first value group, to route the identified customer to a first call queue for connection to one of a first pool of call center agents;

in the event the inbound queue management module classifies the identified customer into the second value group, to route the identified customer to a second call queue for connection to one of a second pool of call center agents.

16. The system according to claim 15, wherein the predictive modeling module comprises a predictive machine-learning model that is continually trained using the customer demographic data, updated payment data, updated marketing costs data and updated lapse data for the leads of the call center.

17. The system according to claim 15, wherein the wherein the predictive modeling module is configured to determine a minimum period of time of payments following sale of the purchased product that results in a positive modeled lifetime value of the product sale based on the customer demographic data, the payment data and the marketing costs data, and identifies lapse for a given purchased product with minimum period of time of payments following sale of the given purchased product that results in a positive modeled lifetime value of the product sale.

18. The system according to claim 15, further comprising a lookup tool that analyzes the customer identifier for the identified customer in real time to retrieve the customer demographic data associated with the customer identifier.

19. The system according to claim 15, wherein the logistic regression model comprises one of a logistic regression model with $l_1$ regularization and a logistic regression model with $l_2$ regularization.

20. The system according to claim 15, wherein the tree based model is a random forests ensemble learning method for classification.

\* \* \* \* \*